US010956206B2

(12) United States Patent
Payet et al.

(10) Patent No.: US 10,956,206 B2
(45) Date of Patent: Mar. 23, 2021

(54) TECHNIQUE FOR MANAGING A CACHE MEMORY IN A SYSTEM EMPLOYING TRANSACTIONAL MEMORY INCLUDING STORING A BACKUP COPY OF INITIAL DATA FOR QUICK RECOVERY FROM A TRANSACTION ABORT

(71) Applicant: Arm Limited, Cambridge (GB)

(72) Inventors: Damien Guillaume Pierre Payet, Antibes (FR); Lucas Garcia, Antibes (FR); Natalya Bondarenko, Antibes (FR); Stefano Ghiggini, Antibes (FR)

(73) Assignee: Arm Limited, Cambridge (GB)

( * ) Notice: Subject to any disclaimer, the term of this patent is extended or adjusted under 35 U.S.C. 154(b) by 74 days.

(21) Appl. No.: 16/372,690

(22) Filed: Apr. 2, 2019

(65) Prior Publication Data

US 2019/0347124 A1 Nov. 14, 2019

(30) Foreign Application Priority Data

May 10, 2018 (GB) .................................. 1807625.7

(51) Int. Cl.
*G06F 9/46* (2006.01)
*G06F 12/0817* (2016.01)
(Continued)

(52) U.S. Cl.
CPC .......... *G06F 9/467* (2013.01); *G06F 11/1458* (2013.01); *G06F 12/0828* (2013.01); *G06F 12/0893* (2013.01)

(58) Field of Classification Search
CPC .. G06F 9/467; G06F 11/1458; G06F 12/0828; G06F 12/0893; G06F 12/0895;
(Continued)

(56) References Cited

U.S. PATENT DOCUMENTS 5,428,761 A 6/1995 Herlihy et al.
2006/0288173 A1 12/2006 Shen
(Continued)

OTHER PUBLICATIONS

Combined Search and Examination Report for GB1807625.7 dated Nov. 13, 2018, 5 pages.

*Primary Examiner* — Jane Wei
(74) *Attorney, Agent, or Firm* — Nixon & Vanderhye P.C.

(57) ABSTRACT

A technique is described for managing a cache structure in a system employing transactional memory. The apparatus comprises processing circuitry to perform data processing operations in response to instructions, the processing circuitry comprising transactional memory support circuitry to support execution of a transaction, and a cache structure comprising a plurality of cache entries for storing data for access by the processing circuitry. Each cache entry has associated therewith an allocation tag, and allocation tag control circuitry is provided to control use of a plurality of allocation tags and to maintain an indication of a current state of each of those allocation tags. The transactional memory support circuitry is arranged, when initial data in a chosen cache entry is to be written to during the transaction, to cause a backup copy of the initial data to be stored in a further cache entry and to cause the allocation tag control circuitry to associate with that further cache entry a selected allocation tag selected for the transaction. The current state of that selected allocation tag is updated to a first state which prevents the processing circuitry from accessing that further cache entry. In the event that the transaction is aborted prior to reaching a transaction end point, the transactional memory support circuitry causes the chosen cache entry to be invalidated, and the allocation tag control circuitry changes the state of the selected allocation tag to a second state that allows the processing circuitry to access the further cache entry. As a result, this enables a hit to subsequently be (Continued)

detected within the cache structure for the initial data without a requirement to refetch the initial data into the cache structure. This can give rise to significant performance enhancements.

23 Claims, 11 Drawing Sheets

(51) Int. Cl.
*G06F 12/0893* (2016.01)
*G06F 11/14* (2006.01)

(58) Field of Classification Search
CPC ............. G06F 12/0897; G06F 12/0815; G06F 12/0842; G06F 12/0871; G06F 2212/604
See application file for complete search history.

(56) References Cited

U.S. PATENT DOCUMENTS

| | | |
|---|---|---|
| 2014/0006698 A1 | 1/2014 | Chappell et al. |
| 2016/0378659 A1 | 12/2016 | Gschwind et al. |
| 2017/0242796 A1 | 8/2017 | Gschwind et al. |

TECHNIQUE FOR MANAGING A CACHE MEMORY IN A SYSTEM EMPLOYING TRANSACTIONAL MEMORY INCLUDING STORING A BACKUP COPY OF INITIAL DATA FOR QUICK RECOVERY FROM A TRANSACTION ABORT

This application claims priority to GB Patent Application No. 1807625.7 filed May 10, 2018, the entire contents of which are hereby incorporated by reference.

The present disclosure relates to a technique for managing a cache structure in a system employing transactional memory.

A data processing system may execute a number of threads of data processing. The threads may be executed on the same processing unit, or on separate processing units within the data processing system. Sometimes, the threads may need to access a shared resource and the nature of the data processing operations may be such that once a thread starts interacting with the shared resource, it may be necessary for a set of operations to complete atomically using the resource without another thread accessing the resource in the meantime.

Rather than employing lock-based mechanisms to control exclusive access to at least one target resource in such situations, a technique which has been developed for handling conflicts between threads accessing shared resources involves the use of transactional memory support. In particular, a data processing system may be provided with transactional memory support circuitry to support execution of a transaction, the transaction comprising a sequence of instructions executed speculatively and for which the processing circuitry is configured to prevent commitment of results of the speculatively executed instructions until the transaction has reached a transaction end point. If it becomes necessary to abort the transaction before the transaction end point is reached, for example because another thread is performing a conflicting access, then it is necessary to be able to restore the state of the processor to the state that existed before the transaction started.

This can cause some issues with regards to the caching of data values within a cache structure. In particular, in known systems it is necessary for the content of any cache lines that are to be written to during a transaction to first be replicated in memory (either main memory or a lower level of the memory hierarchy such as an intervening level of cache between the cache structure and main memory), so that if the transaction aborts the affected cache lines can be invalidated without any loss of the original data that existed prior to the transaction being performed. However, this can have a significant performance impact when seeking to retry the transaction, since at that point it is necessary to refetch the data from memory into the caches. Further, the requirement to ensure that the relevant data is replicated in memory before a write is performed in relation to that data during a transaction also has a performance impact, due to the potential requirement to perform clean operations in respect of current cache contents prior to the relevant cache lines being written to during a transaction.

Accordingly, it would be desirable to provide a more efficient technique for managing a cache structure in a system that employs transactional memory.

In one example configuration, there is provided an apparatus comprising: processing circuitry to perform data processing operations in response to instructions, the processing circuitry comprising transactional memory support circuitry to support execution of a transaction, the transaction comprising a sequence of instructions executed speculatively and for which the processing circuitry is configured to prevent commitment of results of the speculatively executed instructions until the transaction has reached a transaction end point; a cache structure comprising a plurality of cache entries for storing data for access by the processing circuitry, each cache entry having associated therewith an allocation tag; allocation tag control circuitry to control use of a plurality of allocation tags and to maintain an indication of a current state of each of those allocation tags; the transactional memory support circuitry being arranged, when initial data in a chosen cache entry is to be written to during the transaction, to cause a backup copy of the initial data to be stored in a further cache entry, and to cause the allocation tag control circuitry to associate with that further cache entry a selected allocation tag selected for the transaction, and to update the current state of the selected allocation tag to a first state which prevents the processing circuitry from accessing that further cache entry; and in the event that the transaction is aborted prior to reaching the transaction end point, the transactional memory support circuitry is arranged to cause the chosen cache entry to be invalidated, and the allocation tag control circuitry is arranged to change the state of the selected allocation tag to a second state that allows the processing circuitry to access the further cache entry, thereby enabling a hit to subsequently be detected within the cache structure for the initial data without a requirement to re-fetch the initial data into the cache structure.

In another example configuration, there is provided a method of managing a cache structure in an apparatus having processing circuitry for performing data processing operations in response to instructions, the processing circuitry having transactional memory support circuitry to support execution of a transaction, the transaction comprising a sequence of instructions executed speculatively and for which the processing circuitry is configured to prevent commitment of results of the speculatively executed instructions until the transaction has reached a transaction end point, the method comprising: providing the cache structure with a plurality of cache entries for storing data for access by the processing circuitry, with each cache entry having associated therewith an allocation tag; employing allocation tag control circuitry to control use of a plurality of allocation tags and to maintain an indication of a current state of each of those allocation tags; when initial data in a chosen cache entry is to be written to during the transaction, storing a backup copy of the initial data in a further cache entry, and causing the allocation tag control circuitry to associate with that further cache entry a selected allocation tag selected for the transaction, and to update the current state of the selected allocation tag to a first state which prevents the processing circuitry from accessing that further cache entry; and in the event that the transaction is aborted prior to reaching the transaction end point, invalidating the chosen cache entry, and causing the allocation tag control circuitry to change the state of the selected allocation tag to a second state that allows the processing circuitry to access the further cache entry, thereby enabling a hit to subsequently be detected within the cache structure for the initial data without a requirement to re-fetch the initial data into the cache structure.

In a yet further example configuration, there is provided an apparatus comprising: processing means for performing data processing operations in response to instructions, the processing means comprising transactional memory support means for supporting execution of a transaction, the transaction comprising a sequence of instructions executed speculatively and for which the processing means is configured to prevent commitment of results of the speculatively executed instructions until the transaction has reached a transaction end point; a cache structure means comprising a plurality of cache entries for storing data for access by the processing means, each cache entry having associated therewith an allocation tag; allocation tag control means for controlling use of a plurality of allocation tags and for maintaining an indication of a current state of each of those allocation tags; the transactional memory support means, when initial data in a chosen cache entry is to be written to during the transaction, for causing a backup copy of the initial data to be stored in a further cache entry, and to cause the allocation tag control means to associate with that further cache entry a selected allocation tag selected for the transaction, and to update the current state of the selected allocation tag to a first state which prevents the processing means from accessing that further cache entry; and in the event that the transaction is aborted prior to reaching the transaction end point, the transactional memory support means for causing the chosen cache entry to be invalidated, and the allocation tag control means for changing the state of the selected allocation tag to a second state that allows the processing means to access the further cache entry, thereby enabling a hit to subsequently be detected within the cache structure means for the initial data without a requirement to re-fetch the initial data into the cache structure means.

The present technique will be described further, by way of illustration only, with reference to examples thereof as illustrated in the accompanying drawings, in which.

Figure 1:
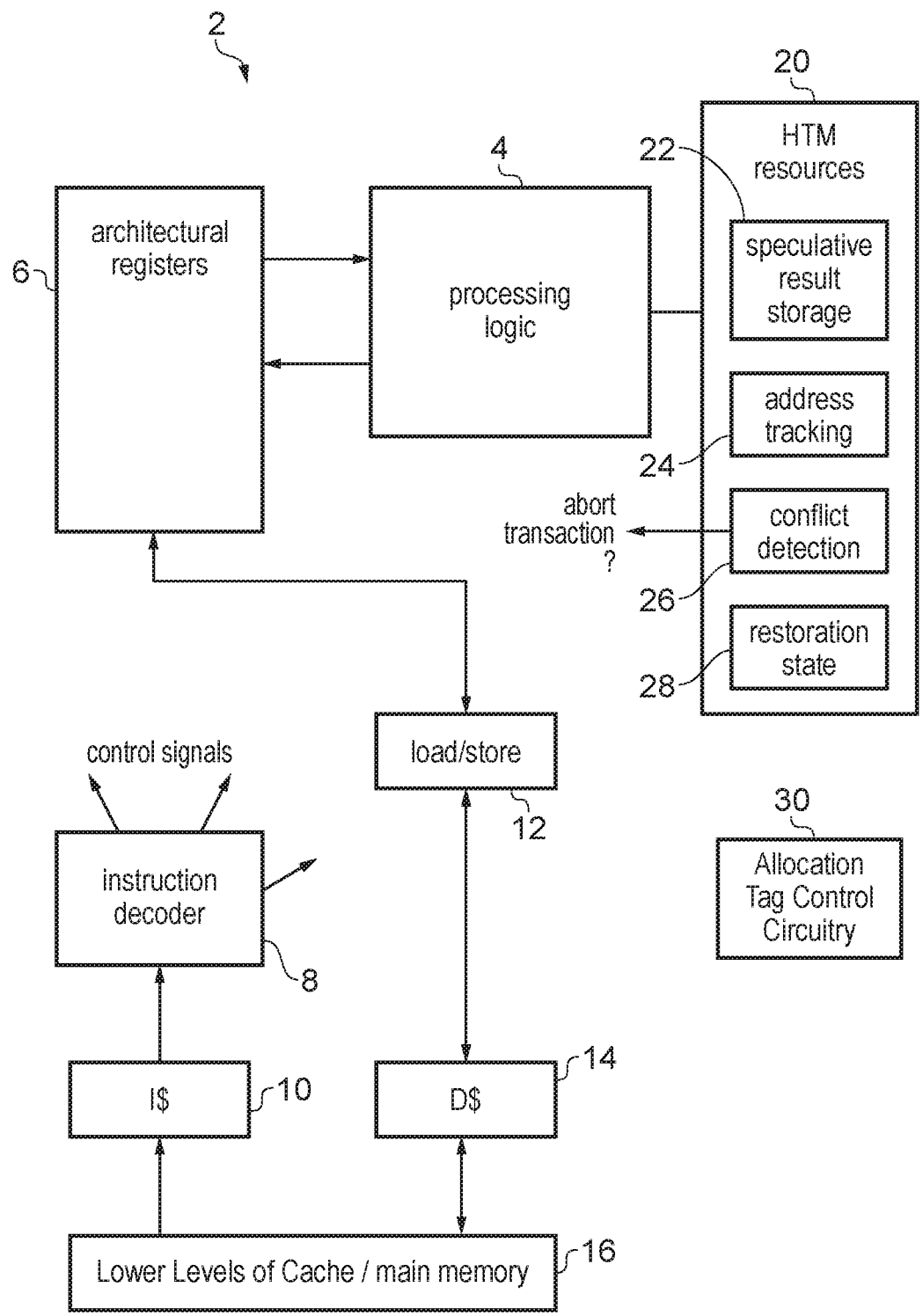
FIG. 1 is a block diagram of a data processing system in accordance with one example.

As discussed above, data processing systems employing a transactional memory architecture allow atomic and strongly isolated execution of blocks of instructions forming a transaction. The atomicity ensures that a transaction is seen by other threads (which may also be referred to as agents) as one operation, and the isolation ensures the strict separation between transactional and non-transactional code. Hence, systems employing transactional memory architectures can allow access to a data structure whose composition is dynamic in nature in a way that enables a set of operations to complete atomically using the data structure without a requirement to use locking mechanisms or the like.

In order to be able to guarantee the atomicity and isolation of accesses to a data structure during performance of a transaction, it is necessary to track the cache lines read and written to by a transaction. In particular, the cache lines read by a transaction being performed by one thread should not be written to by another thread before the transaction ends. Those cache lines read by a transaction may be said to be part of a read set of the transaction. Similarly, the cache lines written to by a transaction being performed by one thread should not be read nor written to by another thread before the transaction ends. Those cache lines can be said to be in the write set of the transaction.

There are two ways in which a transaction may finish. Firstly, the transaction may reach a defined transaction end point, meaning that the transaction can be committed, in that its execution has been performed atomically and in a strongly isolated manner. However, alternatively the transaction may be aborted, in a situation where the hardware cannot ensure the atomicity or the strong isolation of the transactional code, for example due to a conflicting access by another thread to one of the shared resources. Hence, in the case of an abort of the transaction, the previous state before execution of the transactional code must be restored, this comprising the processor's registers and the data at the memory locations modified by the transaction (i.e. those in the write set of the transaction).

As a consequence, when including a cache line in the write set of a transaction, it has typically been necessary to first ensure that the cache line is clean, i.e. that its current contents have been written to the memory system. In coherent cache systems, it has also typically been necessary to ensure that the cache line is uniquely held by the cache in question, and hence that the cache line is in the unique clean state. If not, it is necessary to perform the required clean (and potentially cache coherency) operations to ensure that the cache line is placed into the required state before that cache line can be added to the write set. This can have a significant performance impact. Further, when the transaction aborts, any cache lines in the transaction's write set must be invalidated. In coherent cache systems, this can involve further communications with the cache coherency circuitry that is maintaining the coherency of the various caches within the system. For example, in the case of coherent systems maintaining precise directories, it may be considered appropriate to individually indicate the invalidated cache lines to prevent trashing of the directory. Indeed, otherwise this could result in invalidations of potentially useful lines (part of a transaction or not) due to conflicts during allocations of new lines in the directory. Further, if the transaction is retried, it will then typically be necessary to refetch the various cache lines from memory, which has a further performance impact. Hence, there can be a significant impact on the recovery time after a transaction abort has taken place.

The techniques described herein aim to alleviate the performance issues mentioned above, providing a more efficient mechanism for managing a cache structure in a system that employs transactional memory.

In one example arrangement, an apparatus is provided that comprises processing circuitry to perform data processing operations in response to instructions, where the processing circuitry comprises transactional memory support circuitry to support execution of a transaction. As mentioned earlier, the instructions forming the transaction are executed speculatively, in that the results produced by execution of those instructions are not committed until the transaction has reached a transaction end point. The apparatus also includes a cache structure comprising a plurality of cache entries for storing data for access by the processing circuitry, each cache entry having associated therewith an allocation tag. Further, allocation tag control circuitry is provided to control use of a plurality of allocation tags and to maintain an indication of a current state of each of those allocation tags.

The transactional memory support circuitry is arranged, when initial data in a chosen cache line is to be written to during the transaction, to cause a backup of the initial data to be stored in a further cache entry, and to cause the allocation tag control circuitry to associate with that further cache entry a selected allocation tag selected for the transaction. Further, the current state of that selected allocation tag is updated to a first state which prevents the processing circuitry from accessing that further cache entry. Hence, at this point, a backup of the initial data has been stored within the cache, but the allocation tag associated with that backup, and in particular the state of that allocation tag, is such that the backup copy is essentially invisible to the processing circuitry at that point in time. Instead, when performing the transaction, and in particular when writing data to update the initial data, that updated data is written into the original cache entry.

In the event that the transaction is aborted prior to reaching the transaction end point, the transactional memory support circuitry is arranged to cause the chosen cache line to be invalidated, as per the earlier mentioned requirement that requires the state to be restored to the state that existed prior to the transaction starting. However, in addition the allocation tag control circuitry is arranged to change the state of the selected allocation tag to a second state that allows the processing circuitry to access the further cache entry. Hence, at this point the contents of the further cache entry become visible to the processing circuitry, and as will be apparent from the earlier discussion those contents represent the initial data that was in the cache prior to the transaction starting. As a result of changing the state of the selected allocation tag to the second state, this enables a hit to subsequently be detected within the cache structure for the initial data without a requirement to refetch the initial data into the cache structure.

Hence, this can significantly improve performance. For example, if the transaction is retried, then the initial data will still be in the cache, and hence the performance impact of having to refetch that data is avoided. Further, because the initial data is retained within the cache, then in instances where that initial data is dirty (more up-to-date than the copy in memory), there may be no need to clean the cache line to memory before writing to that cache line during the transaction, and instead the dirty version of the initial data is merely retained within the cache, in the further cache entry. Hence, this can also avoid certain performance impacts when cache lines are added into the write set of a transaction. Furthermore, in systems that employ a cache coherency protocol, then at the point that the original cache lines are invalidated upon a transaction abort, there is no need to communicate with the cache coherency circuitry, since at the same time the initial data as held in the further cache entry is made visible by changing the selected allocation tag to the second state, so that the data is in fact still in the cache, and hence the coherency state information being maintained by the cache coherency circuitry is unaffected.

The above mentioned steps can be performed for any cache lines in a write set of the transaction. Hence, the transactional memory support circuitry may be arranged to identify a write set of cache entries identifying each cache entry written to during the transaction, and for each identified cache entry in the write set the transactional memory support circuitry may be arranged to cause a backup copy of the initial data stored in that identified cache entry to be stored in a selected further cache entry, each further cache entry having associated therewith the same selected allocation tag that was selected for the transaction. Then, in the event of the transaction being aborted the transactional memory support circuitry may be arranged to cause each cache entry identified in the write set to be invalidated, whilst the change of the state of the selected allocation tag to the second state allows the processing circuitry to access each further cache entry. It will be appreciated that this can give rise to significant performance benefits. In particular, if the transaction is retried shortly after the abort is processed (in many implementations this will be highly likely as the transaction may be arranged to retry a few times, before reverting to fallback code which may then use a lock or other mechanism to seek to obtain exclusive access to the required resources), it is likely that the data for all of the entries of the write set will still be present in the cache without the need to refetch any of that data. In that event, each cache entry storing the initial data will itself become the chosen cache entry for which a backup is then made in a further cache entry. When the transaction is retried, another allocation tag will be selected for that transaction, and the backup copies will be stored in further cache entries that have that selected allocation tag associated with them, that selected allocation tag being placed into the first state. Hence, the above described process is merely replicated the next time the transaction is retried.

If instead of the transaction being aborted, the transaction reaches the transaction end point, hence indicating that the transaction has been completed as planned, then the transactional memory support circuitry may be arranged to maintain the chosen cache entry as valid after the transaction ends, and the allocation tag control circuitry can be arranged to change the state of the selected allocation tag to a third state so as to cause the further cache entry to be considered to be invalid. Hence, at this point, the backup copy is effectively invalidated as it is no longer needed.

In accordance with the described cache structure, each cache entry has an allocation tag associated therewith. Hence, at the time the data is initially allocated into the cache structure, an allocation tag needs to be associated with that data. In one example arrangement this is achieved through the use of a default allocation tag. In particular, when data is initially allocated into the cache structure, the cache entry in which that data is allocated is arranged to have the default allocation tag associated therewith. This happens irrespective of when the allocation happens, and hence it does not matter if the processing circuitry is currently executing instructions of a transaction or not at the time the allocation happens.

The default allocation tag can be arranged in a variety of ways. However, in one example implementation the current state of the default allocation tag is permanently the second state, no changes to the current state of the default allocation tag being made by the allocation tag control circuitry. Hence, the default allocation tag can be viewed as being a special form of allocation tag whose state does not change. Since the default allocation tag is in the second state, then any cache line that has the default allocation tag associated with it will be visible to the processing circuitry, and hence can be accessed during a lookup operation within the cache structure.

Whenever a backup copy of initial data is stored in a further cache entry during the performance of a transaction, then that further cache entry has associated with it a selected allocation tag that is selected specifically for that transaction. In one example arrangement, for an allocation tag to be available for selection for a transaction by the allocation tag control circuitry, that allocation tag is required to be in a fourth state. Hence, there may be at any point in time a pool of allocation tags that are in the fourth state, and one of those allocation tags can be selected for the current transaction. At the point that it is selected and then used to mark the associated cache entries that store the backup copies that are made during performance of the transaction, the state of that selected allocation tag is changed to the first state as discussed earlier.

There will typically be a finite number of allocation tags provided, and accordingly in one example implementation reclaim circuitry is provided within the apparatus to perform a reclaim operation to transition an allocation tag to the fourth state, the reclaim circuitry being prevented from performing a reclaim operation in respect of an allocation tag whose current state is the first state. By preventing the performance of a reclaim operation in respect of an allocation tag whose current state is the first state, this avoids an allocation tag being reclaimed whilst it is being used in association with a live transaction that has not yet reached the transaction end point, or been aborted. However, once the transaction is finished, either due to it being aborted or reaching the transaction end point, then the state of the associated allocation tag will change to the second state or the third state as discussed earlier, and at that point is available to be reclaimed by the reclaim circuitry.

A number of different triggers can be used to decide when to seek to reclaim a particular allocation tag. For example, the reclaim circuitry could be triggered when the number of available allocation tags in the pool of allocation tags that are currently in the fourth state drops below a certain level. Alternatively, or in addition, the reclaim circuitry can operate as and when there is availability to access the cache structure i.e. when no active access operations are being performed in respect of the cache structure in order to process the requests being made by the processing circuitry during the execution of instructions.

The steps taken during the reclaim operation may typically be dependent on whether the allocation tag being reclaimed is in the second state or the third state. For example, in one implementation, when performing the reclaim operation for a chosen allocation tag in the second state, the reclaim circuitry is arranged, for each cache entry having the chosen allocation tag associated therewith, to change the associated allocation tag to the default allocation tag, and to change the current state of the chosen allocation tag to the fourth state. By changing the associated allocation tag to the default allocation tag, this ensures that the relevant cache entry remains visible to the processing circuitry, whilst enabling the chosen allocation tag to be reclaimed and put back into the pool of available allocation tags for selection in respect of a subsequent transaction.

In one example implementation, when performing the reclaim operation for a chosen allocation tag in the third state, the reclaim circuitry is arranged to invalidate each cache entry having the chosen allocation tag associated therewith, and to change the current state of the chosen allocation tag to the fourth state. Hence, at this point the relevant cache entries are specifically invalidated, so that their contents will no longer be accessible by the processing circuitry. Again, this enables the chosen allocation tag to be added back into the pool of available allocation tags for selection in respect of a subsequent transaction.

The apparatus may comprise lookup circuitry to perform a lookup operation within the cache structure to determine whether data at an address specified by a lookup request is present within the cache structure. In accordance with examples of the technique described herein, the allocation tag mechanism is also used to influence the lookup operation. In particular, when performing the lookup operation the lookup circuitry is arranged to prevent a hit condition being detected for a cache entry unless that cache entry's associated allocation tag is in the second state. As mentioned earlier, the default allocation tag will always be in the second state, and hence any cache entries having the default allocation tag associated therewith will be allowed to give rise to a hit condition being detected. Similarly, any of the other allocation tags whose current state is in the second state will also allow the associated cache entries to be the subject of a hit within the cache structure.

There are a number of ways in which the apparatus can keep track of which allocation tags are currently in the second state. In one example, the allocation tag control circuitry comprises a second state record identifying each allocation tag whose current state is the second state, and the lookup circuitry is arranged to reference the second state record during performance of the lookup operation. In one example, the default allocation tag can be considered to always be a member of the second state record. However, in some implementations it may be decided not to directly encode the default allocation tag into the second state record, and instead the second state record can merely keep a record of those allocation tags whose state is variable, but for which the current state is the second state.

In one example implementation, when performing the reclaim operation for a chosen allocation tag in the second state, the reclaim circuitry is arranged to remove the chosen allocation tag from the second state record. Such an approach ensures that the contents of the second state record are maintained up-to-date, taking into account the activities of the reclaim circuitry.

In one example implementation, the allocation tag control circuitry may further comprise a state tracking record to indicate the current state of the plurality of allocation tags. The state tracking record can be organised in a variety of ways. For example, it could provide a list of each allocation tag, and an indication of the current state of each allocation tag. However, in one example implementation, a more efficient encoding of that information can be provided through the use of a number of pointers. In particular, the state tracking record may incorporate a first pointer to identify a first non-reclaimed allocation tag and a second pointer to identify a most recently used allocation tag selected for a transaction. Hence, the state tracking record merely needs to keep a record of the plurality of allocation tags, and the two pointers.

In one such implementation, the allocation tag identified by the second pointer is in the first state, and each allocation tag located from the first pointer to the second pointer is in the second state when that allocation tag is identified in the second state record, and is otherwise in the third state. All other allocation tags are then assumed to be in the fourth state. Hence, the reclaim circuitry can determine which allocation tags are available to be subjected to the reclaim operation by identifying those allocation tags that are located between the first pointer and the second pointer, excluding the allocation tag specifically identified by the second pointer, which as mentioned earlier is in the first state.

In some example implementations, the cache structure may be one of a plurality of caches within a coherent cache system having cache coherency managed by coherency circuitry. The coherency circuitry can employ any suitable cache coherency protocol in order to keep the contents of the various caches coherent. In such an arrangement, the transactional memory support circuitry may be arranged, prior to causing a backup copy of the initial data to be stored in the further cache entry, to check that a coherency requirement for the initial data is met and, in the absence of the coherency requirement being met, to trigger the coherency circuitry to perform a coherency operation to place the initial data into a coherency state where the coherency requirement is met, before proceeding to make the backup copy.

However, due to the use of the allocation tag mechanism described above, and in particular because a backup copy of the initial data is retained within the cache structure, the coherency requirement for the initial data can be relaxed relative to an implementation that does not employ the allocation tag mechanism. In particular, without the allocation tag mechanism it would typically be necessary for the initial data to be in a unique clean state. The unique state indicates that the cache structure is the only cache storing a copy of the data, and the clean state indicates that the current data in the cache entry is also stored in memory. However, when adopting the allocation tag mechanism described above, the coherency requirement may instead require that the initial data is identified in the cache structure as being in a unique clean state or a unique dirty state. Hence, whilst it is still a requirement for the cache structure to be the only cache holding a copy of the data, the data can be dirty, i.e. more up-to-date than the copy held in memory, since the earlier described mechanism will keep a backup copy of the initial data in the cache and hence it is possible to restore that version of the initial data without needing to seek it from the memory system. This can hence reduce the number of occurrences where it is necessary to employ the coherency circuitry to change the state of the initial data before a backup copy can be made.

When cache entries in the cache structure are evicted to a lower level of cache that is also "allocation tag aware", then the contents of the cache entries can be evicted in the normal manner. However, it is possible that at least one of the levels of cache may not support use of allocation tags and in that instance steps need to be taken to determine how to evict data from the cache structure when it is being evicted to a lower level of cache that does not support use of allocation tags. In one example implementation eviction control circuitry can be used to control eviction of data in such situations, the eviction control circuitry being arranged, when evicting a cache entry from the cache structure:
  (i) to invalidate the cache entry without evicting the data to the lower level of cache when the cache entry's allocation tag is in the third state;
  (ii) to remove the allocation tag from the cache entry prior to performing the eviction of the data to the lower level of cache, when the cache entry's allocation tag is in the second state;
  (iii) to abort the transaction, and remove the allocation tag from the cache entry prior to performing the eviction of the data to the lower level of cache, when the cache entry's allocation tag is in the first state.

This ensures that the data in the cache entry is treated appropriately having regards to the current state of the allocation tag associated with that entry. In particular, if the allocation tag is in the third state, then the data should be treated as invalid, and accordingly it is not appropriate to evict it to the lower level of cache. Conversely, if the allocation tag is in the second state, this indicates that the data should be viewed as being valid and visible, and accordingly that data should be evicted, but it is first necessary to remove the allocation tag from the cache entry contents, as the allocation tag will have no meaning within the lower level of cache. Finally, if the allocation tag is in the first state, the fact that an eviction of that data is occurring implies that the strict atomicity requirements of the transaction have not been met, and accordingly the transaction should be aborted. Since the allocation tag in the first state will be associated with the backup copy, then it is appropriate for that backup copy to be evicted to the lower level of cache, but again the allocation tag should be removed first as that allocation tag will have no meaning in the lower level of the cache.

The first through fourth states can take a variety of forms, but in one example implementation, the first state is an "in use" state, the second state is a "saved" state, the third state is a "discarded" state and the fourth state is an "invalid" state.

In various implementations, it is possible for a plurality of cache structures to operate in an exclusive arrangement, where a data value at a particular memory address can only be stored in one of those caches at a time. In one example implementation, the apparatus may further comprise an additional cache structure operating in an exclusive arrangement with respect to the cache structure, wherein the allocation tag is used as an extension of an address tag such that the data in one of the chosen cache entry and the further cache entry can be moved to the additional cache structure without compromising the exclusive arrangement. Hence, by viewing the allocation tag as an extension of the address tag, then the chosen cache entry and the associated further cache entry can be viewed as relating to different "addresses", and accordingly even in situations where the additional cache is operating in an exclusive arrangement with respect to the cache structure, one of those cache entries can be evicted to the additional cache structure whilst the other is still retained in the original cache structure. This can provide additional flexibility and performance improvements, by avoiding data being evicted beyond the additional cache structure in order to seek to maintain the exclusive arrangement.

As a very specific example case, if the original cache structure is a level 2 cache, and the chosen cache entry and associated further cache entry are initially in the level 2 cache, then it would typically be the case that a write operation performed in the chosen cache entry would cause the contents of that cache entry to be promoted into the level 1 cache. This is possible without needing to evict the backup copy from the level 2 cache, due to the allocation tag being viewed as an extension of the address tag, and hence the chosen cache entry and further cache entry being viewed as relating to different logical addresses.

The cache entries within the cache structure can take a variety of forms. Typically, the cache entries may be the cache lines within the cache structure, each cache line being arranged to store one or more data values that are associated with a particular tag portion of an address. However, in some instances the cache structure can include other storage structures in addition to the cache lines. For example one or more buffer entries may be provided within a buffer employed by the cache structure, a specific example being an eviction buffer that is used to hold data that is being evicted from one level of cache to another level of cache. In such instances, one or more of the cache entries may be buffer entries of such a buffer employed by the cache structure.

Particular examples will now be described with reference to the Figures.

FIG. 1 illustrates an example of a data processing apparatus 2 with hardware transactional memory (HTM) support. The apparatus has processing logic 4 for executing instructions to carry out data processing operations. For example the processing logic 4 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing logic 4 and for storing the results of the executed instructions. An instruction decoder 8 decodes instructions fetched from an instruction cache 10 to generate control signals for controlling the processing logic 4 or other elements of the data processing apparatus 2 to perform the relevant operations. A load/store unit 12 is also provided to perform load operations (in response to load instructions decoded by the instruction decoder 8) to load a data value from a data cache 14 or lower levels of cache/main memory 16 into the architectural registers 6, and store operations (in response to store instructions decoded by the instruction decoder 8) to store a data value from the architectural registers 6 to the data cache 14 or lower levels of cache/main memory 16.

The apparatus 2 also has transactional memory support circuitry 20 which provides various resources for supporting hardware transactional memory (HTM). The HTM resources in the transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted. Whilst shown as a separate block for ease of illustration, one or more of the components within the transactional memory support circuitry 20 (such as elements 22, 24, 26) may be integrated within the data cache structure (s) if desired.

As mentioned earlier, the handling of transactions can cause some issues with regards to the caching of data values within a cache structure, for example within the data cache 14 and/or within one or more of the lower levels of cache 16. In particular, in typical known systems it has been considered necessary for the content of any cache lines that are to be written to during a transaction to first be replicated in memory, so that if the transaction aborts the affected cache lines can be invalidated without any loss of the original data that existed prior to the transaction being performed. This can cause a performance impact due to the potential requirement to perform clean operations in respect of current cache contents prior to the relevant cache lines being written to during a transaction, and in addition can cause significant performance issues when retrying a transaction, since at that point it will typically be necessary to refetch the data from memory into the caches. However, in accordance with the techniques described herein, these potential performance issues are mitigated through the use of allocation tags in association with the data stored within one or more caches, those allocation tags being used in a way that enables backup copies of certain cache line contents to be retained within the cache during performance of a transaction, thereby avoiding the need to replicate the contents in memory before a write to that content within the cache can be performed during a transaction. As will be discussed in more detail with reference to the remaining figures, allocation tag control circuitry 30 can be provided to control the use of a plurality of allocation tags, and to maintain an indication of a current state of each of those allocation tags.

The allocation tag mechanism described herein can be employed in a wide variety of different systems that support performance of transactions. In particular, the techniques can be employed within a single processor environment, such as illustrated in FIG. 2, or a multi-processor environment such as illustrated in FIG. 3.

Figure 2:
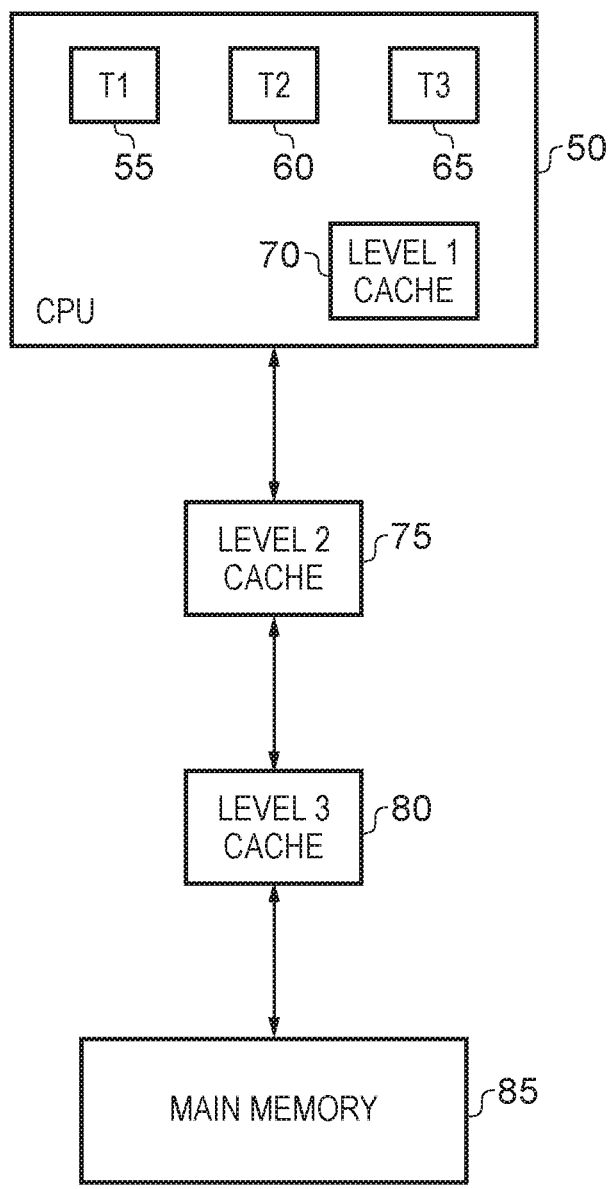
FIG. 2 illustrates an arrangement where a plurality of threads are executed within a single processor.
Figure 3:
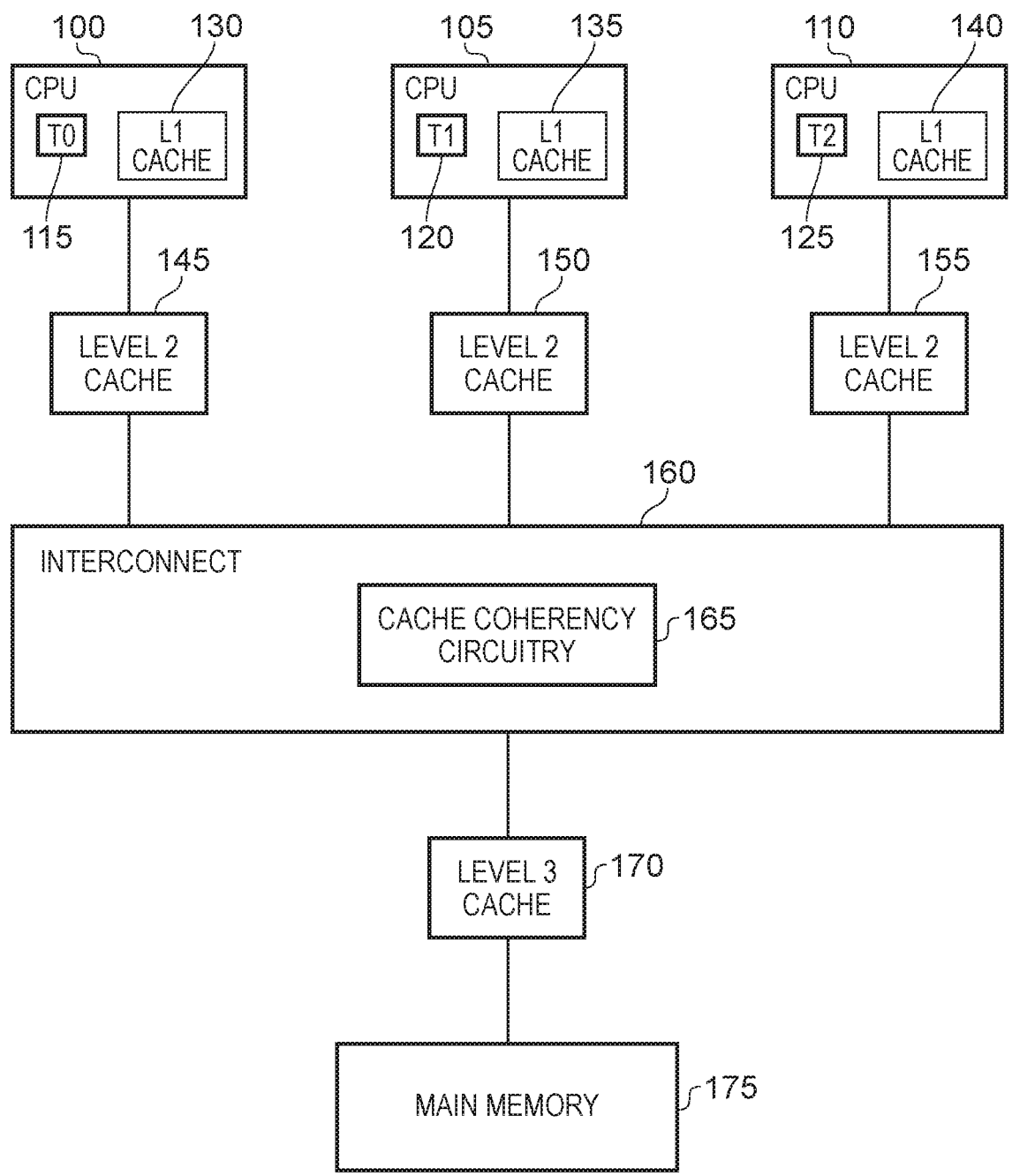
FIG. 3 illustrates an arrangement where a plurality of threads are executed across multiple processors.

Considering first FIG. 2, a single CPU 50 may have an associated level 1 cache 70 and may be arranged to operate in a multi-threaded manner so as to enable execution of a plurality of threads 55, 60, 65. When a transaction is being performed in respect of one of the threads, the HTM resources 20 can be used to maintain in the speculative results storage 22 the results of the instructions executed during the transaction, until it is known whether the transaction has reached a commit point, or instead needs to be aborted. The transaction will for example need to be aborted if one of the other threads seeks to perform a conflicting access to one of the resources being processed by the transaction.

As illustrated in FIG. 2, a number of levels of cache may be provided within the system. In particular, in addition to the level 1 cache 70, there may be a level 2 cache 75, a level 3 cache 80, and indeed potentially some other levels of cache interposed between those levels of cache and main memory 85. It is often the case that certain levels of cache operate in an exclusive arrangement with respect to each other. For example, the level 1 cache 70 and the level 2 cache 75 may operate exclusively, meaning that the data for a particular memory address will only be cached in one of those caches at a time. However, as will be discussed in more detail later, due to the way in which the allocation tag mechanism is used, the backup copy of a cache line that may be created during a transaction can be arranged to have a different allocation tag associated with it to the allocation tag associated with the initial cache line, and by treating the allocation tags as an extension of the address tags, it is possible to allow the initial cache line and the cache line containing the backup copy to reside within two different caches that operate in an exclusive manner. This can reduce the access times to either of those copies, by avoiding the need to evict one of those cache lines to a lower level of cache.

The allocation tag mechanism described herein may be employed in respect of one or more of the levels of cache, but does not need to be employed in respect of all of the levels of cache. For example, one of the lower levels of cache, such as the level 3 cache 80 may be allocation tag unaware. In such instances, an eviction mechanism can be provided that enables appropriate steps to be taken in respect of allocation tags at the time a cache line with an associated allocation tag is evicted to a level of cache that does not support allocation tags.

FIG. 3 illustrates an alternative arrangement to FIG. 2, where multiple processors 100, 105, 110 are provided, each of which may be executing different threads 115, 120, 125, and each of which may have an associated level 1 data cache 130, 135, 140. Further levels of cache may also be provided, which may be dedicated to a particular processor or shared amongst the processors. In the example shown, there are dedicated level 2 caches 145, 150, 155 for each CPU 100, 105, 110, but a shared level 3 cache 170, which may be coupled to main memory 175. An interconnect structure 160 is typically provided for enabling communication between the various elements of the system. Within such an arrangement where individual CPUs may locally cache copies of data, it is typical to provide a cache coherency circuitry 165 in order to implement a cache coherency protocol to maintain the various copies of the data seen by each of the various CPUs in a coherent manner. The cache coherency circuitry can be implemented in a variety of ways, but by way of illustration is shown in FIG. 3 as being a mechanism provided in association with the interconnect 160.

As part of the cache coherency mechanism, the copies maintained within each of the caches that are provided for specific processors can be marked to identify whether that copy is uniquely held by the processor, or to indicate that one of the other processors may also be maintaining a copy. This information can be used to decide on the steps taken when updates to cache lines are made during performance of operations by the various processors. For example, a processor may be prevented from taking certain actions in respect of a cache line in situations where that cache line is not currently uniquely held by that processor. Instead, the processor may need to first contact the cache coherency circuitry 165, to cause appropriate steps to be taken in respect of the copies held by the other processors before the processing required in respect of that cache line can be performed by the processor.

As will be understood by those of skill in the art, the cache coherency circuitry can be implemented in a variety of ways to keep track of the cached contents being held by the various processors. For example, some form of coherency directory can be maintained by the cache coherency circuitry 165 to keep an indication of which processors are currently caching copies of the data at particular memory addresses. As and when required, this information can be used to perform snoop operations in respect of the caches of particular processors in order to cause required coherency actions to be taken, for example invalidation of the local cached copy held by a particular processor.

When performing transactions within such a multi-processor system, the earlier-mentioned potential performance problems associated with handling of the cache contents is further exacerbated by the requirement for cache coherency. For example, prior to the techniques described herein, a processor would typically be prevented from performing a write operation in respect of a cache line during a transaction, until that cache line was confirmed as being in the unique clean state, i.e. the contents were not only stored in memory, but it had also been confirmed that none of the other processors were currently caching a copy of that data. This can further impact the performance of transactions, due to the steps needed to be taken in respect of the cache coherency circuitry 165 in order to place cached data into a unique clean state prior to a write operation in respect of that cached data being performed during the transaction. However, as will be apparent from the discussion of the remaining figures, when using the allocation tag mechanism described herein, whilst it may still be necessary to ensure that the cache line to be written during the transaction is unique, it is no longer necessary for it also to be clean, as a backup copy can be held locally within the cache, and hence restoration to that state can be achieved in the event that the transaction aborts, without needing to refetch the data from memory. Further, if the transaction does abort, since the cache contents can be restored to the state prior to the transaction starting using the backup copy stored locally within the cache, there is no need to perform cache coherency actions in respect of the cache coherency circuitry 165 (e.g. to indicate that the cache lines in the write set have been invalidated), which can further reduce the performance impact when seeking to retry a transaction following an abort.

As with the earlier described example of FIG. 2, one or more levels of the caches may be arranged to operate in an exclusive manner. For example, it may often be the case that a level 1 cache 130, 135, 140 and its associated level 2 cache 145, 150, 155 operate in an exclusive arrangement. With regards to the level 3 cache 170, this may be arranged to be exclusive for certain types of data and inclusive for others. For example, for data in the unique state, it may be arranged to be exclusive, whereas it may otherwise be arranged to be inclusive for data that is shared, i.e. where more than one of the CPUs may simultaneously be caching a copy in its associated level 1 or level 2 cache. Since a cache line has to be in the unique state prior to a write being performed to it during a transaction, such exclusive behaviour can give rise to a significant performance impact when retrying a transaction, in a system that does not employ the allocation tag mechanism described herein. In particular, if the transaction is aborted, then the contents of that current cache line has to be invalidated, and when the transaction is retried, the data needs to be fetched from memory 175, since copies will not exist in the level 3 cache 170 or the associated level 2 cache 145, 150, 155 due to the exclusive behaviour implemented by those caches in respect of data in a unique state. However, with the technique described herein, that performance impact is avoided, since a local backup copy is still retained within the cache, and hence can be accessed directly following an abort of the transaction, avoiding the time penalty associated with refetching the data from memory. It should be noted that this performance impact is also avoided within a system such as shown in FIG. 2, when the various levels of cache operate in an exclusive manner with respect to each other. Further, in a cache coherent system such as shown in FIG. 3, the need to inform the cache coherency circuitry that the cache lines are no longer held in the cache is also avoided.

Figure 4:
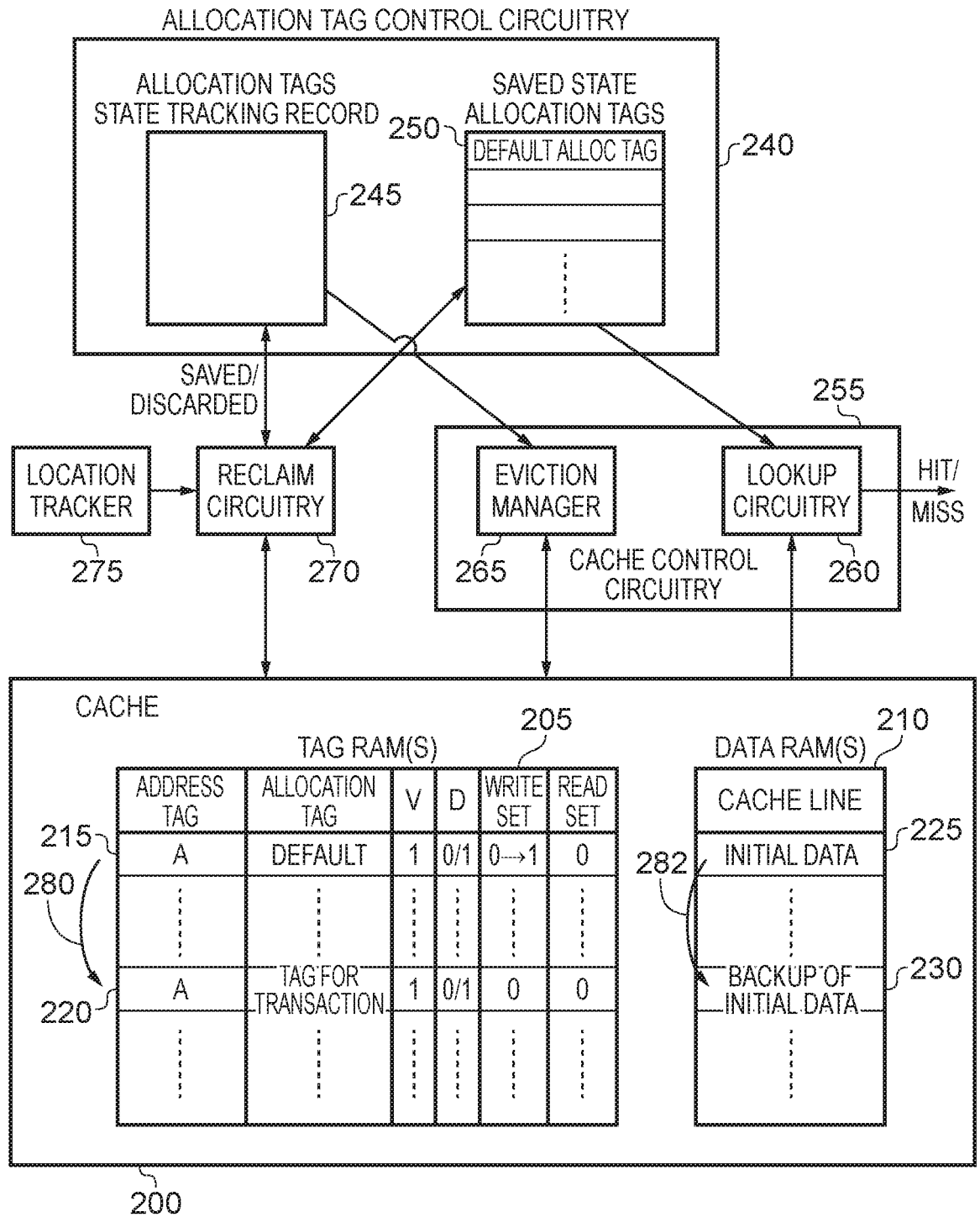
FIG. 4 is a diagram schematically illustrating use of an allocation tag mechanism in accordance with one example arrangement.

FIG. 4 is a diagram schematically illustrating the use of allocation tags in accordance with the technique described herein. A cache 200 that is allocation tag aware may be arranged as shown schematically in FIG. 4. In particular, the cache may have one or more tag RAM(s) 205 and associated data RAM(s) 210. In accordance with a standard arrangement, each tag RAM entry will provide a number of pieces of information that relate to the data stored in the corresponding cache line of the data RAM. Hence, an address tag field is used to store an address portion that is common to all of the data stored in the associated cache line. Various attribute fields may also be provided within the tag RAM entry, such as a valid bit to identify whether the current cache line is valid, and a dirty bit whose value indicates whether the current contents of the cache line are more up-to-data (i.e. dirty) than the copy held in main memory. As will be understood, when a valid cache line is evicted, if the dirty bit is set, it is then necessary to perform a clean operation in order to write the current contents of the cache line back to memory before the cache line is invalidated.

As also shown in FIG. 4, each tag RAM entry may include a write set field and a read set field, whose values can be set to identify whether the contents of the associated cache line are within a write set or a read set of a transaction. This information is used as part of the conflict detection mechanism of the HTM resources. In particular, as discussed earlier, the cache lines in the read set of a transaction are the cache lines read by a transaction, and those cache lines should not be written to by another thread before the transaction ends. Similarly, the cache lines written to by a transaction are referred to as the write set of the transaction, and those cache lines should not be read nor written to by another thread before the transaction ends.

In accordance with the techniques described herein, an allocation tag is also associated with each cache line. Whilst the allocation tag can be stored in a variety of ways, in one example implementation, another field is provided within each tag RAM entry in order to store the allocation tag.

When a cache line is initially allocated into the cache, whether during performance of a transaction or otherwise, a default allocation tag is associated with that cache line. The default allocation tag is considered to be a special form of allocation tag whose state does not change. In particular, the default allocation tag is always assumed to be in a saved state (also referred to herein as a second state). However, in addition to the default allocation tag, there are also a plurality of further allocation tags that are managed by the allocation tag control circuitry 240. The allocation tag control circuitry 240 maintains an allocation tag state tracking record 245 that is arranged to identify the current state of each of the plurality of allocation tags managed by the allocation tag control circuitry 240. As will be discussed in more detail herein, each of the allocation tags tracked by the record 245 can be in one of four states, namely an "invalid" state (also referred to herein as a fourth state) indicating that the allocation tag is available to be selected to associate with a transaction, an "in use" state (also referred to herein as a first state) indicating that the allocation tag is currently being used in association with a transaction, a "saved state" (also referred to herein as a second state) which is the state set for an allocation tag when the associated transaction aborts, and a "discarded" state (also referred to herein as a third state) which is the state set for an allocation tag when the associated transaction reaches a transaction end point, and accordingly commits.

The allocation tag control circuitry 240 also maintains a saved state allocations tag record 250 identifying those allocation tags whose current state is the earlier mentioned saved state. The default allocation tag is always assumed to be in the saved state, and hence can either be directly identified within the saved state allocations tag record 250, or need not be directly identified therein if desired, given that it will always be considered to be in the saved state.

As will be discussed in more detail with reference to the remaining figures, the cache control circuitry 255 used to control various operations performed in respect of the cache can be arranged to take into account the allocation tag information maintained by the allocation tag control circuitry 240. For example, this information can be used to influence how lookup operations are performed by lookup circuitry 260, and in certain instances can be used to control eviction operations performed by the eviction manager 265, in particular when a cache line is evicted to a lower level of cache that does not support the use of allocation tags.

Because the allocation tag control circuitry will typically only provide a finite number of allocation tags, then a reclaim mechanism can be implemented by reclaim circuitry 270 in order to seek to reclaim any allocation tags that are currently in the saved or discarded state. In particular, at that point, an allocation tag in either the saved state or the discarded state is not currently actively being used in association with a transaction, but also is not yet in the invalid state where it will be available again for use in association with a subsequent transaction. Hence, the reclaim circuitry can perform certain operations in order to enable an allocation tag in either the saved state or the discarded state to be placed back into the invalid state, in association with appropriate steps taken in connection with any cache lines that currently have that allocation tag associated with it.

FIG. 4 illustrates by the arrows 280, 282 a step that may be taken when, during a transaction, a cache line is to be added to the write set of the transaction. Assuming any criteria is met that is required before a cache line can be added to the write set, then a backup copy is made of the initial data within a further cache line. Hence, as shown in FIG. 4, if the cache line in question is the cache line 225, then a backup of the initial data in that cache line can be made within the cache line entry 230, as indicated by the arrow 282. At the same time, the corresponding tag entry 220 for the backup copy 230 is populated with information derived from the tag entry 215 associated with the initial cache line 225. Hence, the address tag information is copied across to the new tag entry 220, as is the valid and dirty information. However, rather than copying the allocation tag information across, instead an allocation tag is chosen for the current transaction, and an indication of that allocation tag is stored within the allocation tag field of the further tag entry 220. Assuming this is the first cache line to be added into the write set, then the allocation tag for the transaction will be chosen from amongst the allocation tags identified in the record 245 that are currently in the invalid state, and once the allocation tag is selected, that allocation tag will then be placed into the "in use" state.

The allocation tag for the original cache line 225 as identified in the entry 215 is unaffected by this process, and will be the same as it was prior to the cache line being added into the write set. In the example shown in FIG. 4, it is assumed that the default allocation tag is associated with the initial cache line 225. When the backup copy is made, the original cache line 225 can be added into the write set, as indicated by the transition of the write set field of the associated tag RAM entry 215 from the logic 0 to the logic 1 state. The steps taken thereafter will be discussed in more detail later with reference to a series of flow diagrams.

As mentioned earlier, the reclaim circuitry 270 can be arranged to perform a reclaim operation in respect of any allocation tags in the saved or discarded state, this also involving taking associated actions in respect of the cache lines that use such an allocation tag. Whilst in one implementation, once a particular allocation tag in the saved or discarded state has been selected for reclaiming, the reclaim circuitry may perform a lookup throughout the entirety of the cache to identify any entries using that allocation tag, in an alternative implementation a location tracking mechanism 275 may be provided to keep track of those locations that have been used for storing backup copies of data during the performance of transactions, since it is those backup copies that will have used the allocation tag. The location tracker can be arranged in a variety of ways. For example, it may be that certain portions of the cache are reserved for use in storing backup copies, or alternatively the location tracker may merely keep some other form of entry identifier information to maintain a record of which entries have been used for making backup copies.

It will be appreciated that the cache can be arranged in a variety of ways, and the organisation of the cache may influence where backup copies are made within the cache. For example, in a fully associative cache, a backup copy may be able to be made in any available cache line within the cache. However, in an implementation using a set associative cache structure, then it will typically be the case that the backup copy will be made within another entry of the same set that contains the original cache line. Alternatively the backup copy could be made to another level of cache that supports the allocation tag mechanism, so as to avoid the associativity issues that arise when storing the original cache line and backup copy within the same cache. It should be noted that this other level of cache does not need to be able to track the write set of the transaction in such a situation.

The allocation tags state tracking record 245 can take a variety of forms. For example, in one implementation, it may identify each of the plurality of allocation tags, and have an additional field associated with each allocation tag to identify the current state. It will be appreciated that, in an implementation that uses the four states discussed earlier, the state could be indicated by a 2-bit field provided in association with each allocation tag.

Figure 5:
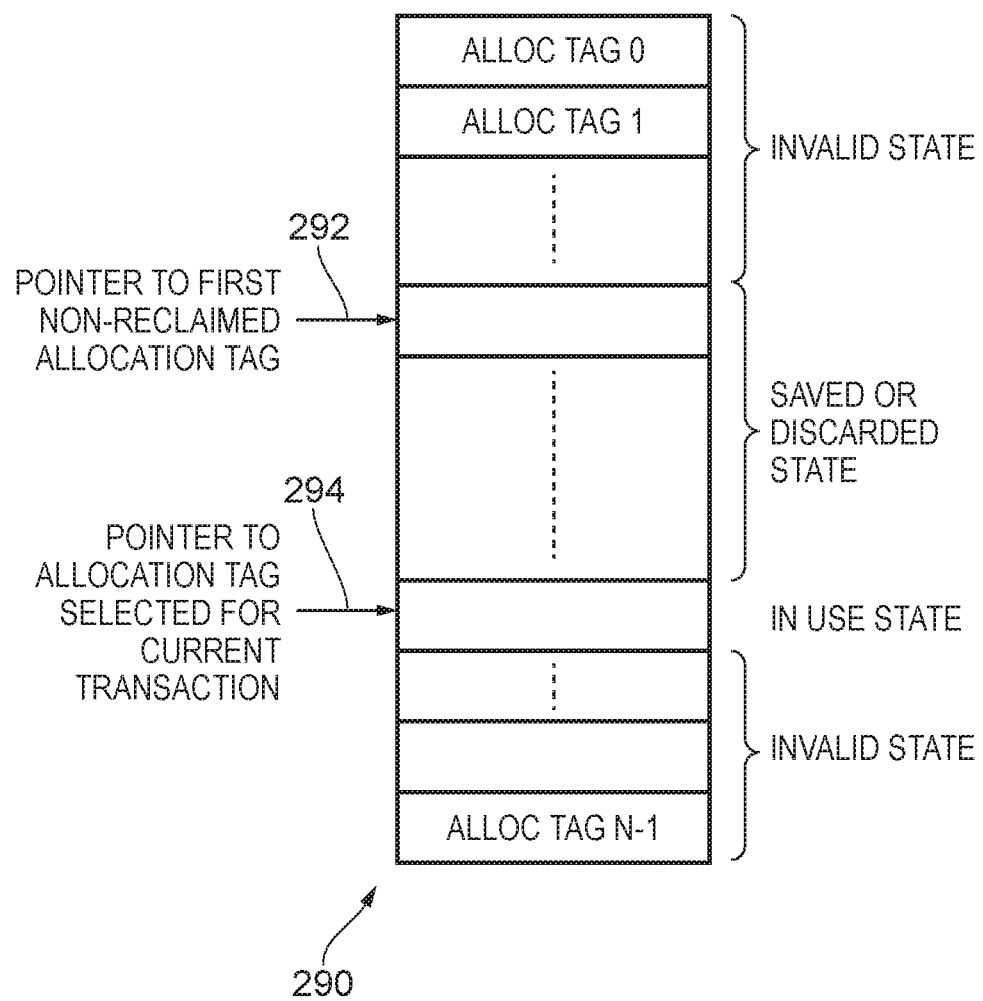
FIG. 5 is a diagram illustrating in more detail one arrangement of the allocation tag state tracking record of FIG. 4 in accordance with a particular example.

However, a more efficient encoding of the allocation tag state information can be achieved using a pair of pointers, as illustrated in FIG. 5. Hence, in this example, list 290 identifies each of the possible allocation tags, other than the default allocation tag. Here it is assumed that there are N allocation tags in addition to the default allocation tag, and each of those allocation tags is identified by an entry in the list 290. A first pointer 292 is then used to point to the first non-reclaimed allocation tag, whilst a second pointer 294 points to an allocation tag that is selected for a current transaction. The allocation tag pointed to by the pointer 294 will be in the "in use" state. In this example, it is assumed that only one transaction will be active at a time, and accordingly there will be only one allocation tag in the "in use" state. All of the allocation tags between the first pointer 292 and the entry just prior to the second pointer 294 will be in the saved or discarded state. In particular, an allocation tag within that region of the list will be in the saved state if it is directly identified in the saved state allocation tags record 250, and will otherwise be in the discarded state. All of the other allocation tags will be in the invalid state, as illustrated in FIG. 5. It will be appreciated that such an arrangement of allocation tags state tracking record avoids the need to specifically provide an additional field for each allocation tag to identify its state, hence saving space.

Further, while a storage could be provided to identify the list 290, in some implementations this will not be necessary. For example, the list of allocation tags could be inferred from all of the possible values that the pointers 292, 294 can take. For instance, if we consider two 4-bit pointers, 4'b0000 could be used as the default allocation tag and the pointers could be prevented from taking this value. The other allocation tags can then be any value encodable using the 4 bits. In such an implementation, there is no need to even provide fields to identify the allocation tags.

The pointer 294 will be incremented each time a new transaction is started, and accordingly the next allocation tag is selected for that transaction. Similarly the pointer 292 will be incremented each time the reclaim circuitry reclaims the associated allocation tag. The pointers will typically be arranged to perform a wrapping operation such that when the final entry in the list 290 is reached by a pointer, the pointer is then adjusted to identify the first entry in the list.

Figure 6:
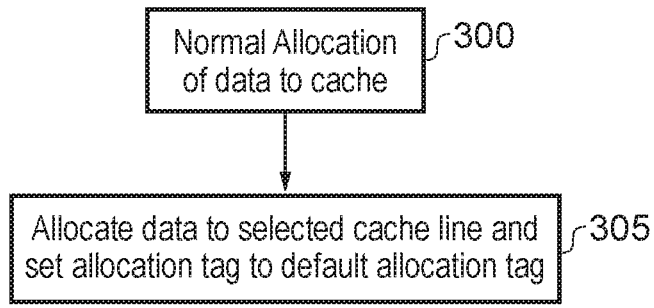
FIG. 6 is a flow diagram illustrating the process adopted on initial allocation of data into the cache in accordance with one example.

FIG. 6 schematically illustrates normal allocation of data into the cache. In particular, on a normal allocation at step 300 the process proceeds to step 305 where the data is allocated into an available cache line in the standard manner, but in addition the allocation tag field is set to identify the default allocation tag.

Figure 7:
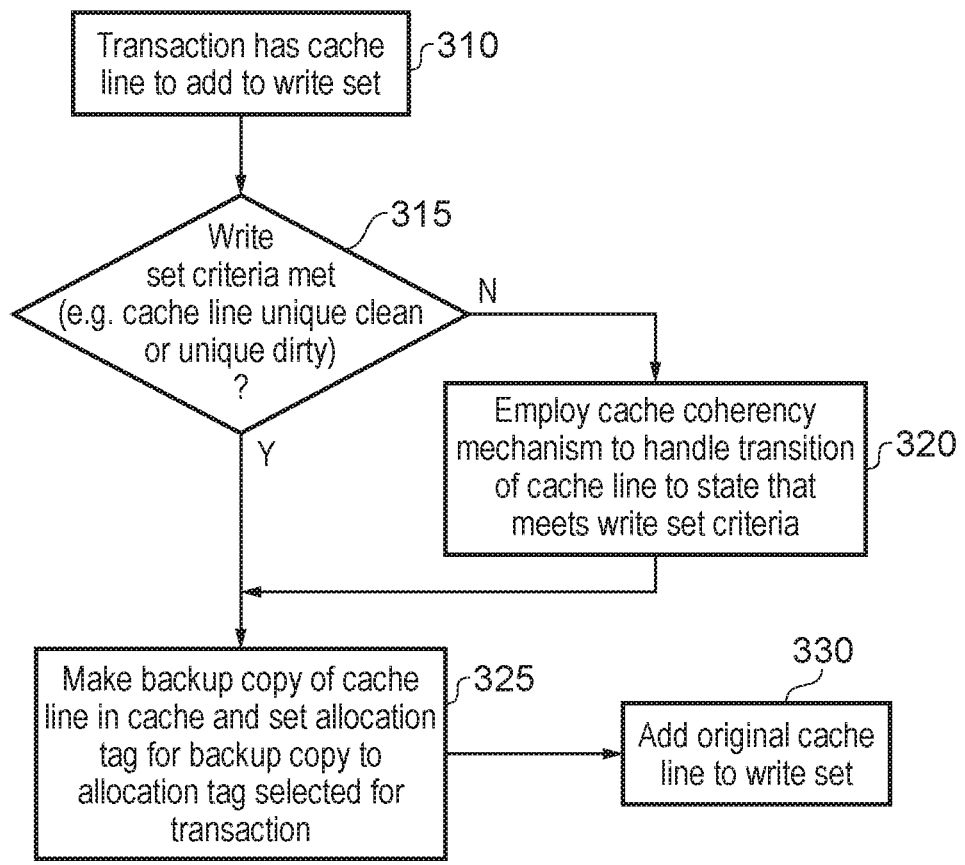
FIG. 7 is a flow diagram illustrating the steps taken when adding a cache line to the write set of a transaction in accordance with one example.

FIG. 7 is a flow diagram illustrating the steps taken when a cache line is to be added to the write set of a transaction. Hence, once at step 310 it is identified that the transaction has a cache line that is to be added to the write set, the process proceeds to step 315 where it is determined whether any write set criteria are met. In a single processor system such as FIG. 2, there may not be any particular write set criteria at this point, but within a multi-processor system such as shown in FIG. 3 employing cache coherency, it may be required that the cache line is held in the unique state, hence confirming that no other CPUs hold a local cached copy of the data. However, when using the allocation tag scheme, the cache line can be in the unique clean or the unique dirty state and there is no requirement in respect of dirty data to perform a clean operation in order to bring the copy in memory up-to-date at the time step 315 is performed.

If the write set criteria is not met, then the process proceeds to step 320 where an appropriate mechanism is used to transition the state of the cache line so that the write set criteria is met. Considering the cache coherency example, this may involve the cache coherency circuitry 165 performing various snoop operations in respect of the cache contents held by other processors in order to cause them to clean and/or invalidate any copies they have, so that the processor performing the transaction can be guaranteed to have a unique copy of the data, at which point the cache line can be marked as being in the unique clean or unique dirty state.

Assuming the write set criteria are met at step 315, or the corrective steps are taken at step 320, then the process proceeds to step 325 where a backup copy of the cache line is made within the cache, and the allocation tag for the backup copy is set to an allocation tag that is selected for the transaction. At that point, the original cache line can then be added to the write set at step 330.

Figure 8:
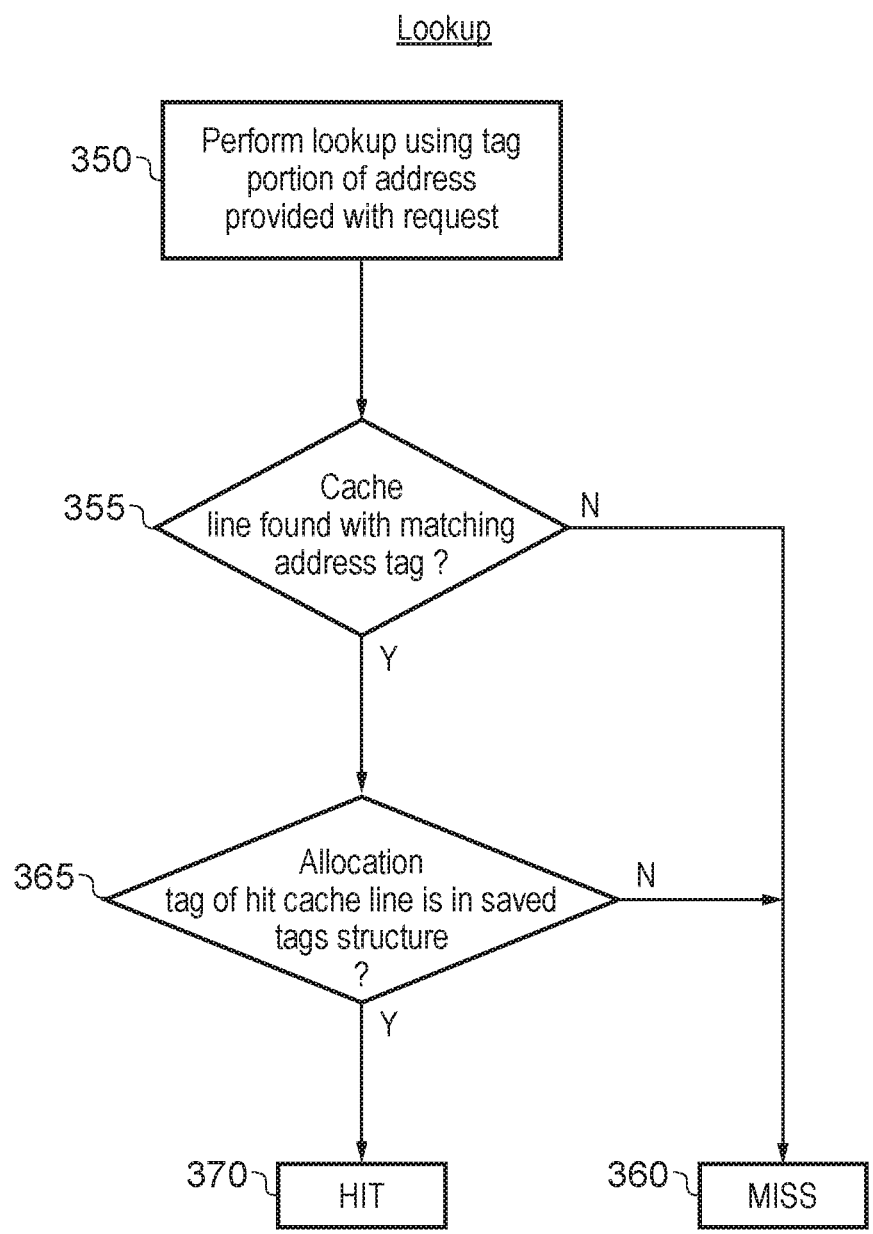
FIG. 8 is a flow diagram illustrating a cache lookup operation in accordance with one example.

FIG. 8 is a flow diagram illustrating how lookup operations are managed by the lookup circuitry 260 of FIG. 4, in one example implementation. At step 350, a lookup operation is performed using the tag portion of the address provided by the lookup request in order to identify whether that tag portion matches the address tag held within one of the entries of the tag RAM. Depending on the structure of the cache, another portion of the address may first be used to identify some candidate entries within the cache whose address tags are to be compared with the tag portion of the address provided by the request. For example, in a set associative cache structure, an index portion of the address will first be used to identify a particular set within the set associative cache, and then the entries within that set will be used when comparing the tag portion of the address with the corresponding address tag fields in those entries.

At step 355, it is determined whether a cache line has been found with a matching address tag, from amongst those cache lines subjected to the lookup operation. If not, then a miss is detected at step 360. However, if a match is detected, then a further qualifying step is performed before determining whether there is a hit. In particular, at step 365, it is determined whether the allocation tag of the hit cache line is in the saved tags structure 250. As mentioned earlier, the default allocation tag will always be assumed to be in that structure, and accordingly if the default allocation tag is associated with the cache line, there will be a hit. However, in addition, as will be discussed later with reference to FIG. 9, when a transaction aborts, the allocation tag associated with the backup copy is transitioned into the saved state and identified in the saved tags structure 250, hence making the backup copy visible when performing lookup operations. In the event that the allocation tag of the hit cache line is in the saved tags structure, then a hit is detected at step 370, but otherwise it is determined that a miss has occurred at step 360.

Figure 9:
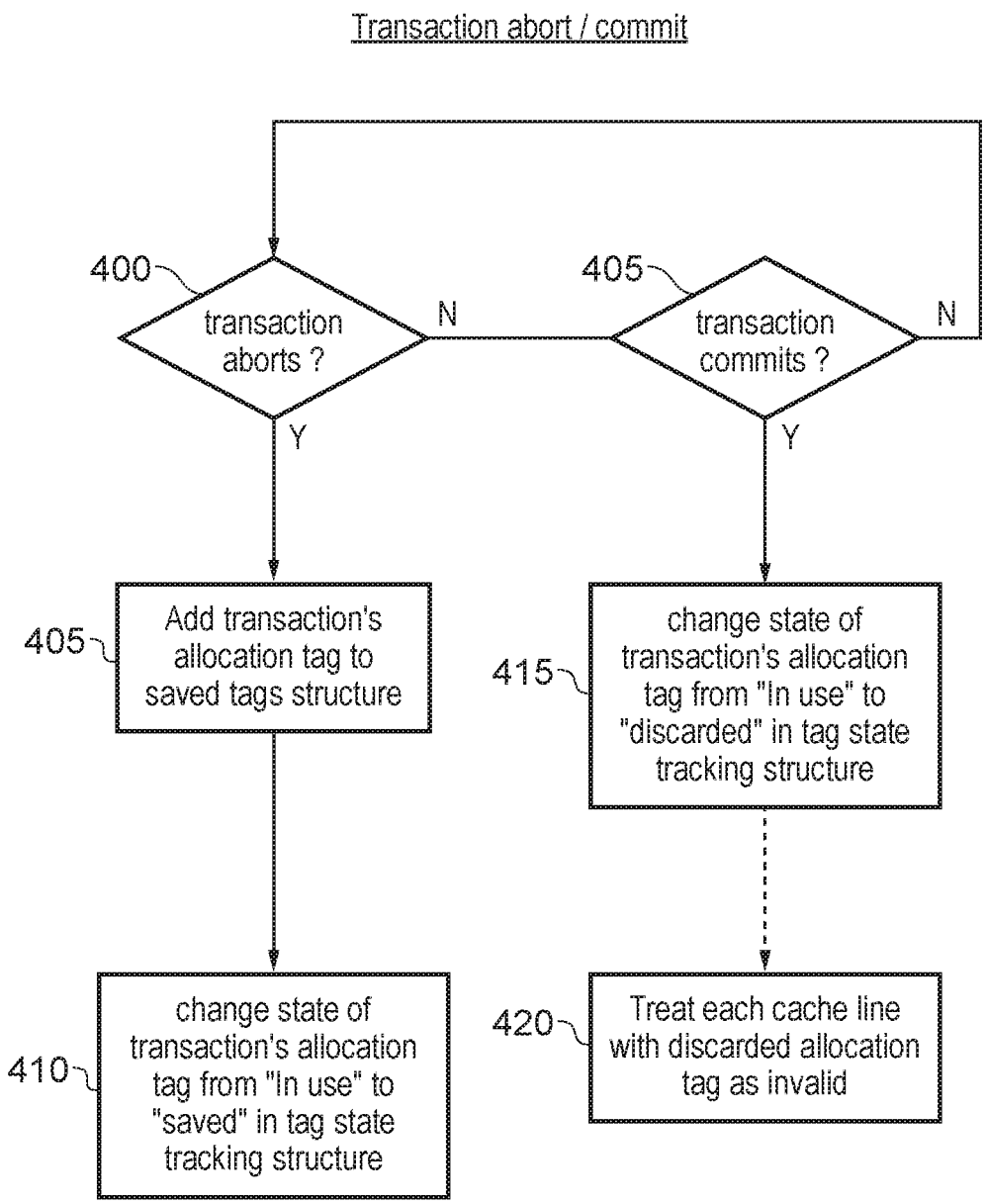
FIG. 9 is a flow diagram illustrating the steps taken on transaction abort or transaction commit, in accordance with one example.

FIG. 9 is a flow diagram illustrating the steps taken upon a transaction abort or transaction commit, in respect of the backup copy of an initial cache line. If at step 400 it is determined that a transaction has aborted, then the transaction's allocation tag is added to the saved state allocation tags structure 250 at step 405. Also, at step 410, the state of the transaction's allocation tag is changed from the in use state to the saved state in the tag state tracking structure 245. With regards to this latter step, it will be appreciated that when using the implementation of FIG. 5, this is in fact achieved by incrementing the pointer 294 so that it points to the next allocation tag, with the "saved" state of the transaction's allocation tag then being inferred from the fact that that allocation tag has been added to the saved state allocation tags record 250.

If instead it is determined that the transaction has reached a commit point at step 405, then the state of the transaction's allocation tag is changed from the in use state to the discarded state in the tag state tracking structure 245. No update is made to the contents of the saved state allocation tags record 250 at this point. Again, considering the implementation of FIG. 5, it will be appreciated that step 415 is simply implemented by incrementing the pointer 294 so as to point to the next allocation tag as being in the in use state, with the discarded state of the transaction's allocation tag then being inferred from the absence of that allocation tag in the saved state allocation tags record 250.

As indicated by the box 420, although not an explicit step taken following determination of a transaction commit point, each cache line having an allocation tag in the discarded state is effectively treated as invalid. However, in one implementation the state of the valid bit is not actually altered at this point since that action can instead be taken at the time of reclaiming the allocation tag using the reclaim circuitry 270. Instead, the fact that the allocation tag is in the discarded state will effectively mean that the cache line having that allocation tag associated with it will be invisible when performing lookup operations, and in particular no hit can be detected in respect of such a cache line.

Since the HTM resources 20 are already arranged to handle various synchronisation issues associated with aborting a transaction or committing a transaction, then appropriate messages to perform steps 405, 410, 415 can be issued from the HTM resources 20 to the allocation tag control circuitry 240 at the appropriate point in time during the abort handling or commit handling of the transaction.

Figure 10A:
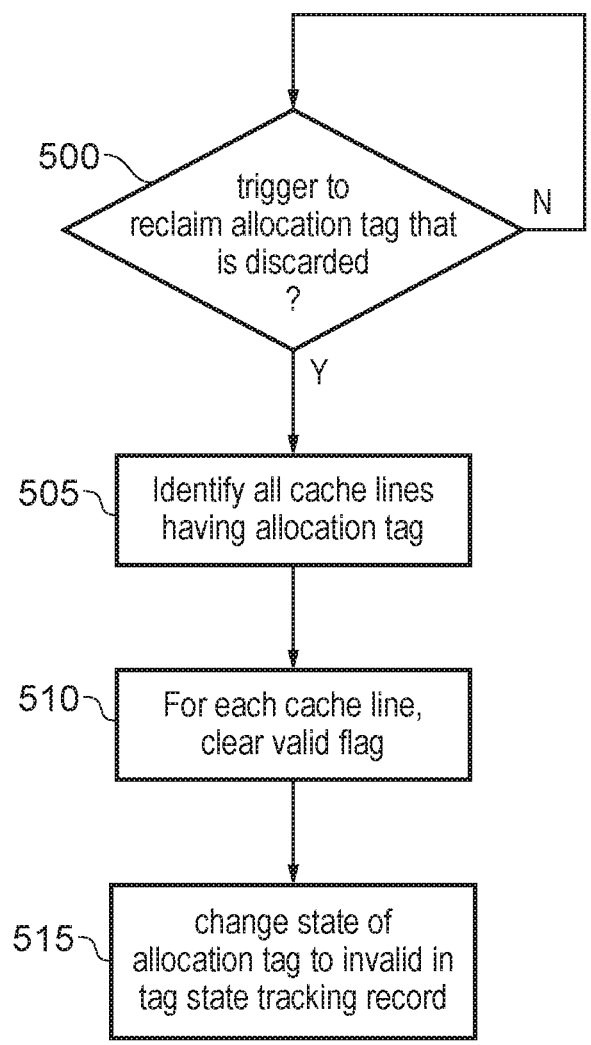
FIGS. 10A and 10B are flow diagrams illustrating allocation tag reclaim mechanisms that may be used in accordance with one example.

FIG. 10A is a flow diagram illustrating an allocation tag reclaim mechanism that can be implemented by the reclaim circuitry 270 for an allocation tag that is currently in the discarded state. At step 500, a trigger is awaited to reclaim such an allocation tag. The trigger can take place for a variety of reasons. For example, the system may be arranged to initiate such a trigger when the number of available allocation tags (i.e. those in the invalid state) drops below a certain level. Alternatively, the reclaim circuitry may operate as and when the cache resources are not otherwise being used by the cache control circuitry 255, in order to seek to reclaim allocation tags during periods of time when the cache is otherwise unused. It will be appreciated that both of the above mechanisms could be used in one implementation.

When the trigger is detected, then the process proceeds to step 505, where the reclaim circuitry identifies all of the cache lines that have that allocation tag associated therewith. As mentioned earlier with reference to FIG. 4, a location tracking mechanism 275 can be used to assist in this process, although alternatively a lookup could be performed within the entirety of the cache in order to identify the relevant cache lines.

At step 510, for each identified cache line, the valid flag in that cache line is cleared, thereby invalidating the cache line contents. It should be noted at this point that no steps need to be taken to deal with dirty data in the event that the dirty flag is set. In particular, if the allocation tag is in the discarded state, this means that the backup copy held in the cache line is no longer up-to-date, and hence, irrespective of whether the cache line contents were dirty or not at the time the backup copy was made, no action needs to be taken, since there will be another cache line holding a more up-to-date version of the data.

Further to step 510, then at step 515 the state of the allocation tag is changed to invalid in the tag state tracking record 245, hence adding that allocation tag back into the pool of available allocation tags for use with future transactions.

Figure 10B:
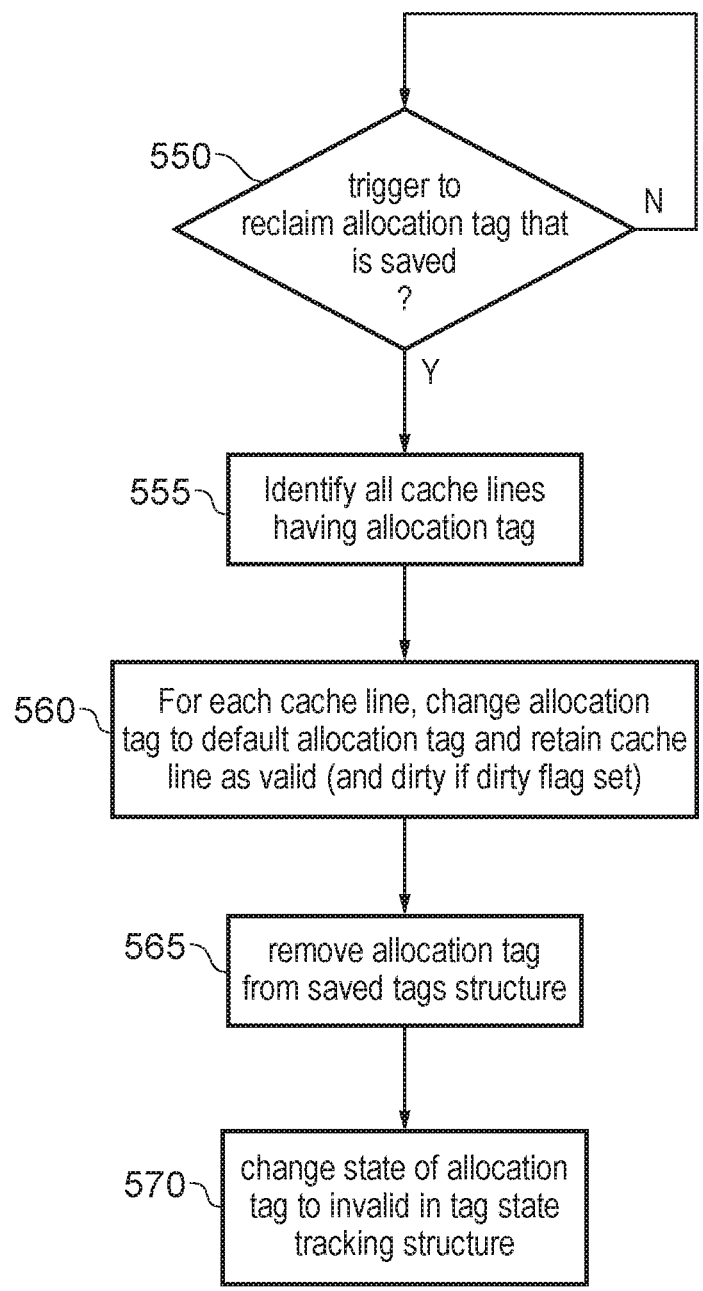

FIG. 10B illustrates the allocation tag reclaim mechanism that may be employed when the allocation tag to be reclaimed is currently in the "saved" state. At step 550, a trigger is awaited to reclaim such an allocation tag. In one example implementation, the same trigger can be used as discussed earlier with reference to step 500 of FIG. 10A. Once the trigger has been detected, then all cache lines having that allocation tag are identified at step 555, in the same way as discussed earlier for step 505 of FIG. 10A. Then, at step 560, for each identified cache line, the allocation tag associated with that cache line is changed to the default allocation tag, and the cache line is retained as valid. In addition, if the dirty flag is set, then the dirty flag is also retained in the set state (i.e. the clean or dirty nature of the cache line is retained). At step 565, the allocation tag is removed from the saved tags record 250, and at step 570 the state of the allocation tag is changed to invalid in the tag state tracking structure 245. Since at step 560 the default allocation tag is associated with the cache line, and the cache line is retained as valid, it will be appreciated that that cache line can continue to be the subject of a hit when performing lookup operations since the default allocation tag is always assumed to be part of the saved state allocation tags record 250.

Figure 11:
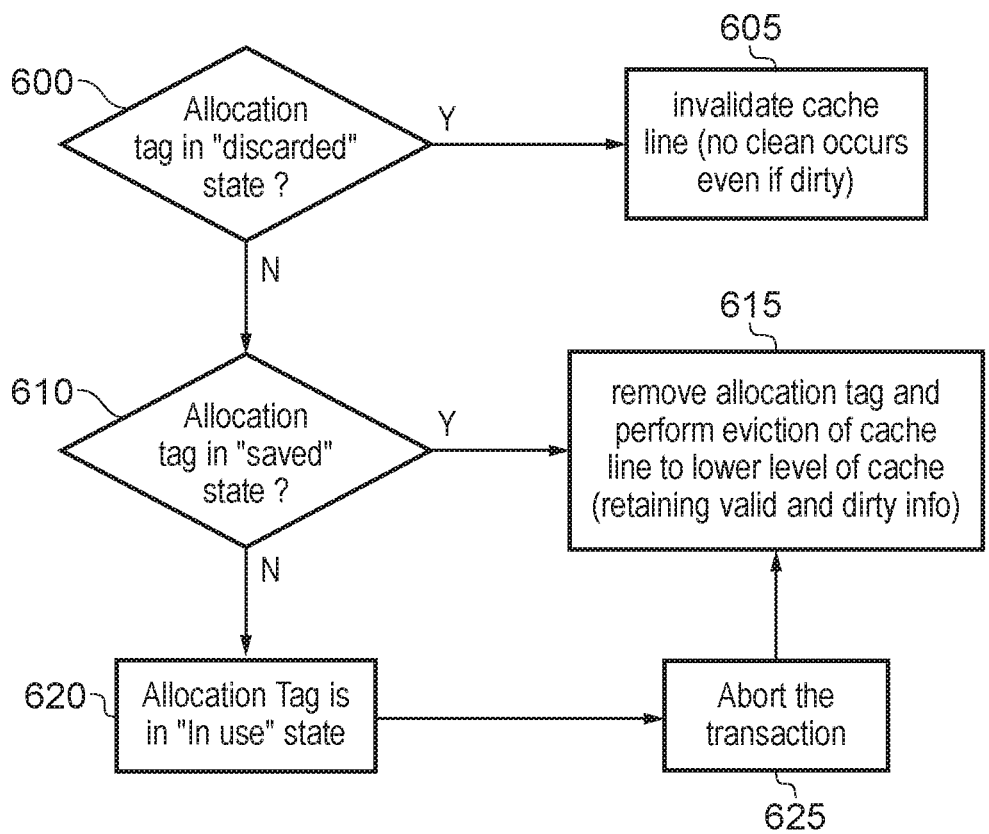
FIG. 11 is a flow diagram illustrating steps taken on eviction of a valid cache line to a level of cache that does not support the allocation tag mechanism of the described examples.

When evicting cache lines from the cache, the allocation tag information can be passed to the lower level of cache assuming the lower level of cache is also allocation tag aware. However, if the lower level of cache to which the cache line is being evicted is not allocation aware, then in one implementation the steps shown in FIG. 11 can be employed in order to manage the eviction process, these steps being performed by the eviction manager 265.

In particular, if at step 600 the allocation tag associated with the entry that is being evicted is in the discarded state, then at step 605 the cache line is invalidated, and no eviction occurs to the lower level of cache. It should also be noted that this step occurs even if the data is marked as dirty since as mentioned earlier the fact that the allocation tag is in the discarded state means that the backup copy that is held in that cache line is no longer the most up-to-date copy, and accordingly should not be referred to again.

If the allocation tag is not in the discarded state, then at step 610 it is determined whether the allocation tag is in the saved state. If so, then at step 615 the allocation tag is removed from the information held within the tag entry, and then the cache line is evicted to the lower level of cache. All of the other information is retained, including the valid and dirty information. In particular, since the allocation tag was in the saved state, this indicates that the backup copy is in fact the current valid copy since the transaction was aborted, and hence the contents of the initial cache line were invalidated. In addition, step 615 is also performed in respect of any cache line with the default allocation tag associated therewith, since the default allocation tag is always assumed to be in the saved state.

If at step 610 it is determined that the allocation tag is not in the saved state, then it is known that the allocation tag is in the in use state. In particular, there will be no entries within the cache that will have an allocation tag associated with them that is in the invalid state, since the invalid state is only associated with allocation tags that are currently unused. If an eviction is being performed in respect of an entry whose allocation tag is in the "in use" state, then this indicates a situation where a conflicting access is seeking to be performed, which should hence result in an abort of the transaction. Hence, at step 625 the transaction is aborted, and in addition at step 615 the allocation tag is removed and the cache line is evicted to the lower level of cache. In particular, since the transaction is being aborted, it is known that the backup copy is the current copy that should be retained, and hence it can validly be evicted to the lower level of cache.

Whilst in the above described examples the allocation tag information is maintained in association with the cache lines within a cache, such allocation tag information can also be maintained in association with other entries associated with the cache structure. For example, a cache structure may also include an eviction buffer for temporarily buffering cache line contents that are being evicted from one level of cache to a lower level of cache, and the allocation tag information can also be provided in association with such buffer entries if desired.

It will be appreciated that the above described allocation tag mechanism can enable significant performance improvements to be realised within systems that employ transactional memory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry to perform data processing operations in response to instructions, the processing circuitry comprising transactional memory support circuitry to support execution of a transaction, the transaction comprising a sequence of instructions executed speculatively and for which the processing circuitry is configured to prevent commitment of results of the speculatively executed instructions until the transaction has reached a transaction end point;

a cache memory comprising a plurality of cache entries for storing data for access by the processing circuitry, each cache entry having associated therewith an allocation tag;

allocation tag control circuitry to control use of a plurality of allocation tags and to maintain an indication of a current state of each of those allocation tags;

the transactional memory support circuitry being arranged, when initial data in a chosen cache entry of the cache memory is to be written to during the transaction, to cause a backup copy of the initial data to be stored in a further cache entry of the cache memory, and to cause the allocation tag control circuitry to associate a selected allocation tag selected for the transaction with that further cache entry, and to update the current state of the selected allocation tag to a first state which prevents the processing circuitry from accessing that further cache entry; and in the event that the transaction is aborted prior to reaching the transaction end point, the transactional memory support circuitry is arranged to cause the chosen cache entry of the cache memory to be invalidated, and the allocation tag control circuitry is arranged to change the state of the selected allocation tag to a second state that allows the processing circuitry to access the further cache entry, wherein the chance of the state of the selected allocation tag enables a hit to subsequently be detected within the cache memory for the initial data without a requirement to re-fetch the initial data into the cache memory.

2. An apparatus as claimed in claim 1, wherein:

the transactional memory support circuitry is arranged to identify a write set of cache entries identifying each cache entry written to during the transaction, and for each identified cache entry in the write set the transactional memory support circuitry is arranged to cause a backup copy of the initial data stored in that identified cache entry to be stored in a selected further cache entry, each further cache entry having associated therewith the same selected allocation tag that was selected for the transaction;

whereby in the event of the transaction being aborted the transactional memory support circuitry is arranged to cause each cache entry identified in the write set to be invalidated, whilst the change of the state of the selected allocation tag to the second state allows the processing circuitry to access each further cache entry.

3. An apparatus as claimed in claim 1, wherein in the event that the transaction reaches the transaction end point, the transactional memory support circuitry is arranged to maintain the chosen cache entry as valid after the transaction ends, and the allocation tag control circuitry is arranged to change the state of the selected allocation tag to a third state that causes the further cache entry to be considered to be invalid.

4. An apparatus as claimed in claim 1, wherein when data is initially allocated into the cache memory the cache entry in which that data is allocated is arranged to have a default allocation tag associated therewith.

5. An apparatus as claimed in claim 4, wherein the current state of the default allocation tag is permanently the second state, no changes to the current state of the default allocation tag being made by the allocation tag control circuitry.

6. An apparatus as claimed in claim 1, wherein for an allocation tag to be available for selection for a transaction by the allocation tag control circuitry, that allocation tag is required to be in a fourth state.

7. An apparatus as claimed in claim 6, further comprising reclaim circuitry to perform a reclaim operation to transition an allocation tag to the fourth state, the reclaim circuitry being prevented from performing a reclaim operation in respect of an allocation tag whose current state is the first state.

8. An apparatus as claimed in claim 7, wherein:
when data is initially allocated into the cache memory the cache entry in which that data is allocated is arranged to have a default allocation tag associated therewith; and
when performing the reclaim operation for a chosen allocation tag in the second state, the reclaim circuitry is arranged, for each cache entry having the chosen allocation tag associated therewith, to change the associated allocation tag to the default allocation tag, and to change the current state of the chosen allocation tag to the fourth state.

9. An apparatus as claimed in claim 7, wherein when performing the reclaim operation for a chosen allocation tag in the third state, the reclaim circuitry is arranged to invalidate each cache entry having the chosen allocation tag associated therewith, and to change the current state of the chosen allocation tag to the fourth state.

10. An apparatus as claimed in claim 1, further comprising:
lookup circuitry to perform a lookup operation within the cache memory to determine whether data at an address specified by a lookup request is present within the cache memory, wherein when performing the lookup operation the lookup circuitry is arranged to prevent a hit condition being detected for a cache entry unless that cache entry's associated allocation tag is in the second state.

11. An apparatus as claimed in claim 10, wherein:
the allocation tag control circuitry comprises a second state record identifying each allocation tag whose current state is the second state, and the lookup circuitry is arranged to reference the second state record during performance of the lookup operation.

12. An apparatus as claimed in claim 8, further comprising:
lookup circuitry to perform a lookup operation within the cache memory to determine whether data at an address specified by a lookup request is present within the cache memory, wherein when performing the lookup operation the lookup circuitry is arranged to prevent a hit condition being detected for a cache entry unless that cache entry's associated allocation tag is in the second state;
wherein:
the allocation tag control circuitry comprises a second state record identifying each allocation tag whose current state is the second state, and the lookup circuitry is arranged to reference the second state record during performance of the lookup operation; and
when performing the reclaim operation for a chosen allocation tag in the second state, the reclaim circuitry is arranged to remove the chosen allocation tag from the second state record.

13. An apparatus as claimed in claim 1, wherein the allocation tag control circuitry comprises a state tracking record to indicate the current state of the plurality of allocation tags.

14. An apparatus as claimed in claim 12, wherein the state tracking record incorporates a first pointer to identify a first non-reclaimed allocation tag, and a second pointer to identify a most recently used allocation tag selected for a transaction.

15. An apparatus as claimed in claim 14, wherein:
the allocation tag identified by the second pointer is in the first state;
each allocation tag located from the first pointer to the second pointer is in the second state when identified in the second state record and otherwise is in the third state; and
all other allocation tags are in the fourth state.

16. An apparatus as claimed in claim 1, wherein:
the cache memory is one of a plurality of caches within a coherent cache system having cache coherency managed by coherency circuitry; and
the transactional memory support circuitry is arranged, prior to causing a backup copy of the initial data to be stored in the further cache entry, to check that a coherency requirement for the initial data is met and, in the absence of the coherency requirement being met, to trigger the coherency circuitry to perform a coherency operation to place the initial data into a coherency state where the coherency requirement is met, before proceeding to make the backup copy.

17. An apparatus as claimed in claim 16, wherein the coherency requirement requires the initial data to be identified in the cache memory structure as being in a unique clean state or a unique dirty state.

18. An apparatus as claimed in claim 1, further comprising:
eviction control circuitry to control eviction of data from the cache memory to a lower level of cache that does not support use of allocation tags, the eviction control circuitry being arranged, when evicting a cache entry from the cache memory:
(i) to invalidate the cache entry without evicting the data to the lower level of cache when the cache entry's allocation tag is in the third state;

(ii) to remove the allocation tag from the cache entry prior to performing the eviction of the data to the lower level of cache, when the cache entry's allocation tag is in the second state;

(iii) to abort the transaction, and remove the allocation tag from the cache entry prior to performing the eviction of the data to the lower level of cache, when the cache entry's allocation tag is in the first state.

19. An apparatus as claimed in claim 3, wherein:

for an allocation tag to be available for selection for a transaction by the allocation tag control circuitry, that allocation tag is required to be in a fourth state; and the first state is an "in use" state, the second state is a "saved" state, the third state is a "discarded" state and the fourth state is an "invalid" state.

20. An apparatus as claimed in claim 1, further comprising an additional cache memory operating in an exclusive arrangement with respect to the cache memory, wherein the allocation tag is used as an extension of an address tag such that the data in one of the chosen cache entry and the further cache entry can be moved to the additional cache memory without compromising the exclusive arrangement.

21. An apparatus as claimed in claim 1, wherein the cache entries are cache lines within the cache memory.

22. An apparatus as claimed in claim 1, wherein one or more of the cache entries are buffer entries of a buffer employed by the cache memory.

23. A method of managing a cache memory in an apparatus having processing circuitry for performing data processing operations in response to instructions, the processing circuitry having transactional memory support circuitry to support execution of a transaction, the transaction comprising a sequence of instructions executed speculatively and for which the processing circuitry is configured to prevent commitment of results of the speculatively executed instructions until the transaction has reached a transaction end point, the method comprising:

providing the cache memory with a plurality of cache entries for storing data for access by the processing circuitry, with each cache entry having associated therewith an allocation tag;

employing allocation tag control circuitry to control use of a plurality of allocation tags and to maintain an indication of a current state of each of those allocation tags;

when initial data in a chosen cache entry of the cache memory is to be written to during the transaction, storing a backup copy of the initial data in a further cache entry of the cache memory, and causing the allocation tag control circuitry to associate a selected allocation tag selected for the transaction with that further cache entry, and to update the current state of the selected allocation tag to a first state which prevents the processing circuitry from accessing that further cache entry; and in the event that the transaction is aborted prior to reaching the transaction end point, invalidating the chosen cache entry of the cache memory, and causing the allocation tag control circuitry to change the state of the selected allocation tag to a second state that allows the processing circuitry to access the further cache entry, wherein the change of the state of the selected allocation tag enables a hit to subsequently be detected within the cache memory for the initial data without a requirement to re-fetch the initial data into the cache memory.

* * * * *